US012702097B2

(12) United States Patent
Knowles

(10) Patent No.: US 12,702,097 B2
(45) Date of Patent: Aug. 11, 2026

(54) SYSTEM FOR PROVIDING ROTARY POWER TO IMPLEMENTS OF MACHINES

(71) Applicant: Caterpillar Inc., Peoria, IL (US)

(72) Inventor: Jason Stephen Knowles, Pittsboro, NC (US)

(73) Assignee: Caterpillar Inc., Peoria, IL (US)

( * ) Notice: Subject to any disclaimer, the term of this patent is extended or adjusted under 35 U.S.C. 154(b) by 361 days.

(21) Appl. No.: 17/660,719

(22) Filed: Apr. 26, 2022

(65) Prior Publication Data

US 2023/0341049 A1 Oct. 26, 2023

(51) Int. Cl.

| | |
|---|---|
| ***A01G 23/06*** | (2006.01) |
| ***F16H 61/421*** | (2010.01) |
| ***F16H 61/423*** | (2010.01) |
| ***F16H 61/44*** | (2006.01) |
| ***F16H 61/47*** | (2010.01) |
| ***F16H 61/472*** | (2010.01) |

(52) U.S. Cl.

CPC ......... *A01G 23/067* (2013.01); *F16H 61/423* (2013.01); *F16H 61/44* (2013.01); *F16H 61/47* (2013.01); *F16H 61/472* (2013.01); *F16H 61/421* (2013.01)

(58) Field of Classification Search

None

See application file for complete search history.

(56) References Cited

U.S. PATENT DOCUMENTS

| | | | | |
|---|---|---|---|---|
| 5,207,060 A * | 5/1993 | Sheets | F16H 61/448 180/242 |
| 5,415,495 A * | 5/1995 | Johnson | E01C 23/088 404/90 |
| 7,243,755 B2 * | 7/2007 | Legner | F16H 61/44 180/305 |

(Continued)

FOREIGN PATENT DOCUMENTS

| | | |
|---|---|---|
| EP | 3025569 B1 | 12/2017 |
| JP | H0776984 A * | 3/1995 |

(Continued)

OTHER PUBLICATIONS

JP-H0776984-A machine translation to English from espacenet (Year: 2025).*

(Continued)

*Primary Examiner* — Michael Quandt

(57) ABSTRACT

A system, for providing a rotary power to an implement of a machine, includes a first motor control valve associated with a first motor of the machine and a second motor control valve associated with a second motor of the machine. The first motor control valve is configured to be actuated at a first shift point to shift the first motor such that the first motor and the second motor switch between a first implement drive speed and a second implement drive speed. The second motor control valve is configured to be actuated at a second shift point to shift the second motor such that the first motor and the second motor switch between the second implement drive speed and a third implement drive speed. The first and (Continued)

second shift points are based on loading of the implement during operation. In addition, the first and second shift points are different.

14 Claims, 7 Drawing Sheets

(56) References Cited

U.S. PATENT DOCUMENTS

| | | | | |
|---|---|---|---|---|
| 7,303,159 | B2 * | 12/2007 | Hishiyama | B02C 18/24 241/36 |
| 7,523,879 | B2 * | 4/2009 | Umeda | B02C 18/24 241/34 |
| 7,690,176 | B2 * | 4/2010 | Shinn | A01G 23/00 56/11.9 |
| 8,571,753 | B2 | 10/2013 | Robillard et al. | |
| 11,272,666 | B2 * | 3/2022 | Daining | A01D 69/03 |

FOREIGN PATENT DOCUMENTS

| | | | |
|---|---|---|---|
| JP | 2008240503 | A * | 10/2008 |
| WO | 2021079176 | A1 | 4/2021 |

OTHER PUBLICATIONS

JP-2008240503-A machine translation to English from espacenet (Year: 2025).*

* cited by examiner 196,204
196,200
504 First pressure sensor
508 Second pressure sensor
520 transceiver
516 processor
512 memory
500 Controller

SYSTEM FOR PROVIDING ROTARY POWER TO IMPLEMENTS OF MACHINES

TECHNICAL FIELD

The present disclosure relates generally to forestry machines, such as a mulching machine. More particularly, the present disclosure relates to providing rotary power to an implement, e.g., a cutting drum, of such machines.

BACKGROUND

Mulching machines are used to mulch (e.g., cut or shred) materials such as trees, logs, branches, bushes, and the like. In some implementations, mulching machines may include an implement and rotary drive for the implement. The implement may include a cutting drum having multiple cutting tools. The rotary drive for rotating the implement may include one or more drive motors. As the implement turns, the cutting tools of the implement may be brought into contact with the materials to be mulched to cut or shred the materials into smaller pieces.

In some implementations, the rotary drive may operate either at high speed and low torque, when the implement is unloaded or under low loads, or at relatively lower speed and higher torque, when the implement is under comparatively higher loads. However, there is a need to provide rotary drive control for mulching machines that improves productivity at intermediate loads.

SUMMARY OF THE INVENTION

In one aspect, the disclosure relates to a system for providing a rotary power to an implement of a machine. The system includes a first motor control valve associated with a first motor of the machine and a second motor control valve associated with a second motor of the machine. The first motor control valve is configured to be actuated at a first shift point to shift the first motor such that the first motor and the second motor switch between a first implement drive speed and a second implement drive speed. The second motor control valve is configured to be actuated at a second shift point to shift the second motor such that the first motor and the second motor switch between the second implement drive speed and a third implement drive speed. The first and second shift points are based on loading of the implement during operation. In addition, the first and second shift points are different.

In yet another aspect, the disclosure is related to a machine. The machine includes an implement, and a first motor and a second motor to rotatably drive the implement. Also, the machine includes a system configured to provide a rotary power to the implement. The system includes a first motor control valve associated with the first motor and a second motor control valve associated with the second motor. The first motor control valve is configured to be actuated at a first shift point to shift the first motor such that the first motor and the second motor switch between a first implement drive speed and a second implement drive speed. The second motor control valve is configured to be actuated at a second shift point to shift the second motor such that the first motor and the second motor switch between the second implement drive speed and a third implement drive speed. The first and second shift points are based on loading of the implement during operation. In addition, the first and second shift points are different.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
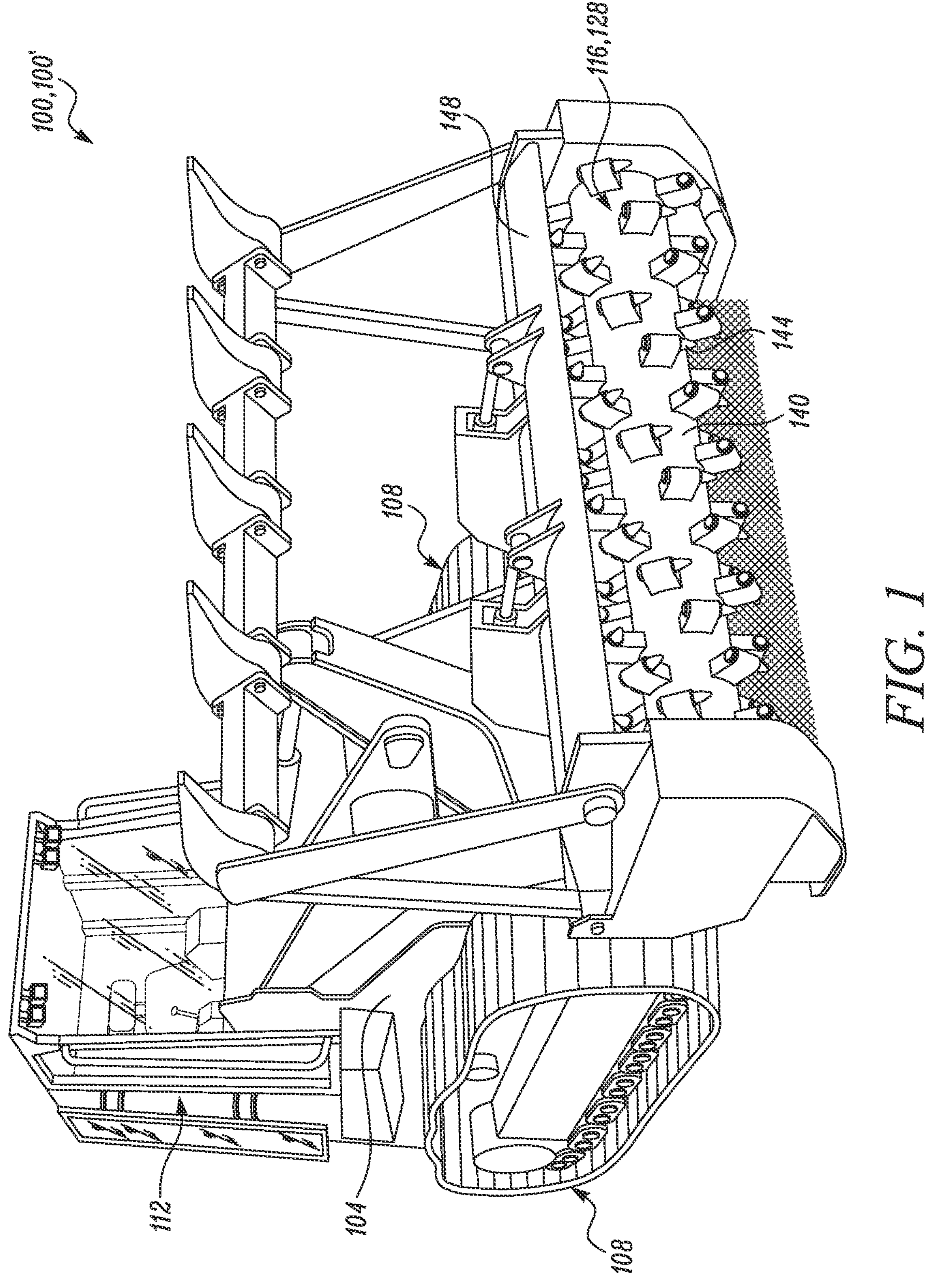
FIG. 1 illustrates an exemplary machine having an implement, in accordance with an embodiment of the present disclosure

Referring to FIG. 1, an exemplary machine 100 is shown. The machine 100 may be used in a variety of applications including forestry, farming or agriculture, mining, quarrying, construction, landscaping, etc. As an example, the machine 100 may include a track loader 100'. The machine 100 may be employed to cut, shred, or mulch materials such as trees, logs, branches, bushes, and the like. Although references to the track loader 100' are used, aspects of the present disclosure may also be applicable to other machines, such as pavers, feller bunchers, excavators, dozers, wheel loaders, backhoe loaders, skid-steer loaders, and the like, and references to the track loader 100' in the present disclosure is to be viewed as purely exemplary.

Referring to FIGS. 1, 2, 3, and 4, the machine 100 includes a frame 104, ground-engaging members 108, an operator cabin 112, an implement 116, a first motor 120, and a second motor 124. The frame 104 may support the operator cabin 112, although other known components and structures may be supported by the frame 104, as well. The ground-engaging members 108 may be configured to move and propel the machine 100 from one location to another, e.g., during a mulching operation. In the present embodiment, two ground-engaging members 108 are provided, one on each side of the machine 100. The operator cabin 112 may facilitate stationing of one or more operators therein, to monitor the operations of the machine 100.

Figure 2:
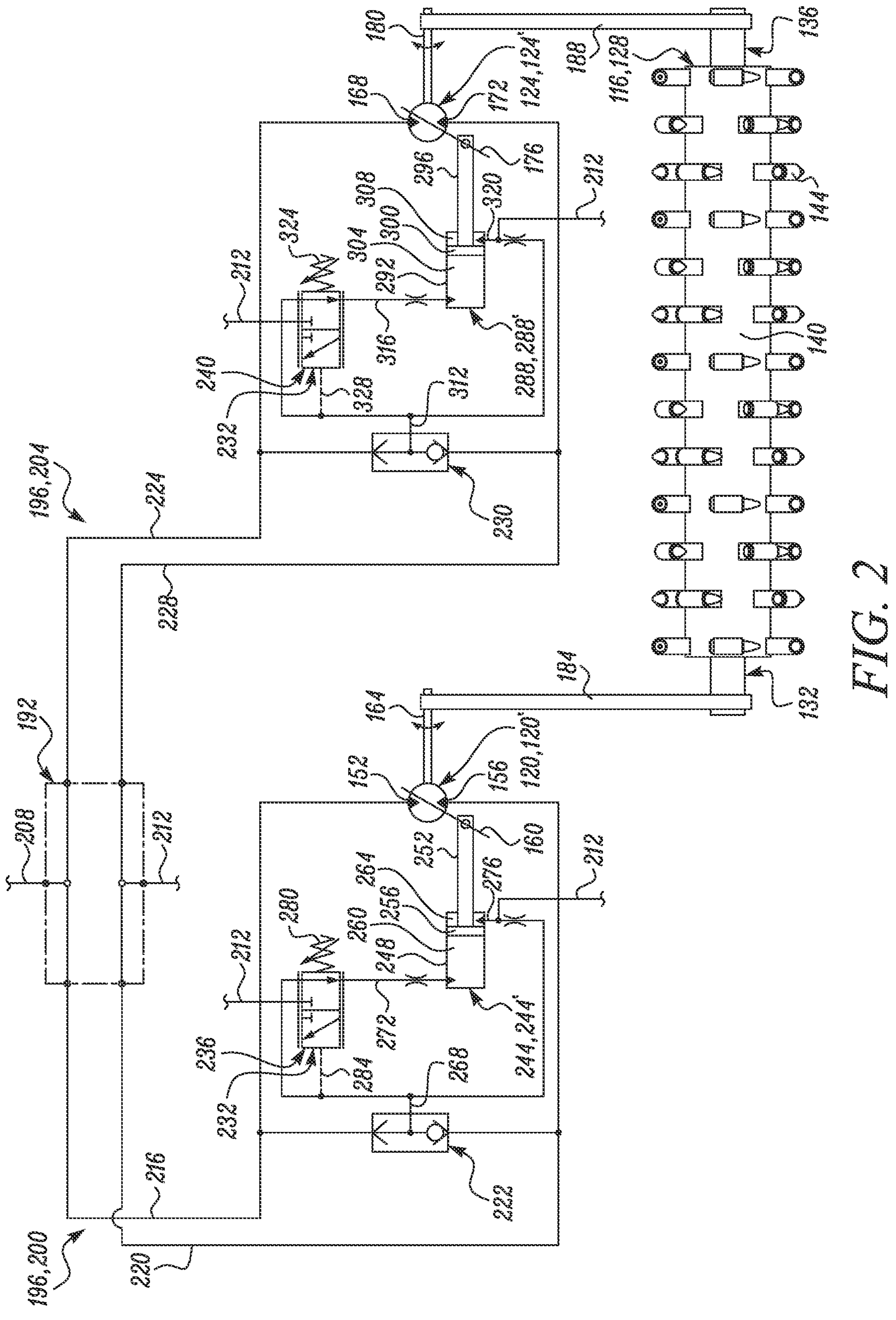
FIG. 2 illustrates a schematic diagram of an exemplary system configured to rotatably drive the implement at a first implement drive speed, in accordance with an embodiment of the present disclosure.

The implement 116 may include a cutting drum 128 having a first end portion 132, a second end portion 136, a periphery 140 that extends between the first end portion 132 and the second end portion 136, and multiple cutting tools 144 arranged around the periphery (please see FIG. 2). The implement 116 may be supported by the frame 104. For example, the implement 116 may be housed within a chamber 148 coupled to the frame 104. During the mulching operation, the implement 116 may be powered to rotate and cut (or shred) the materials (e.g., trees, bushes, etc.) that the implement 116 may come in contact with.

Figure 3:
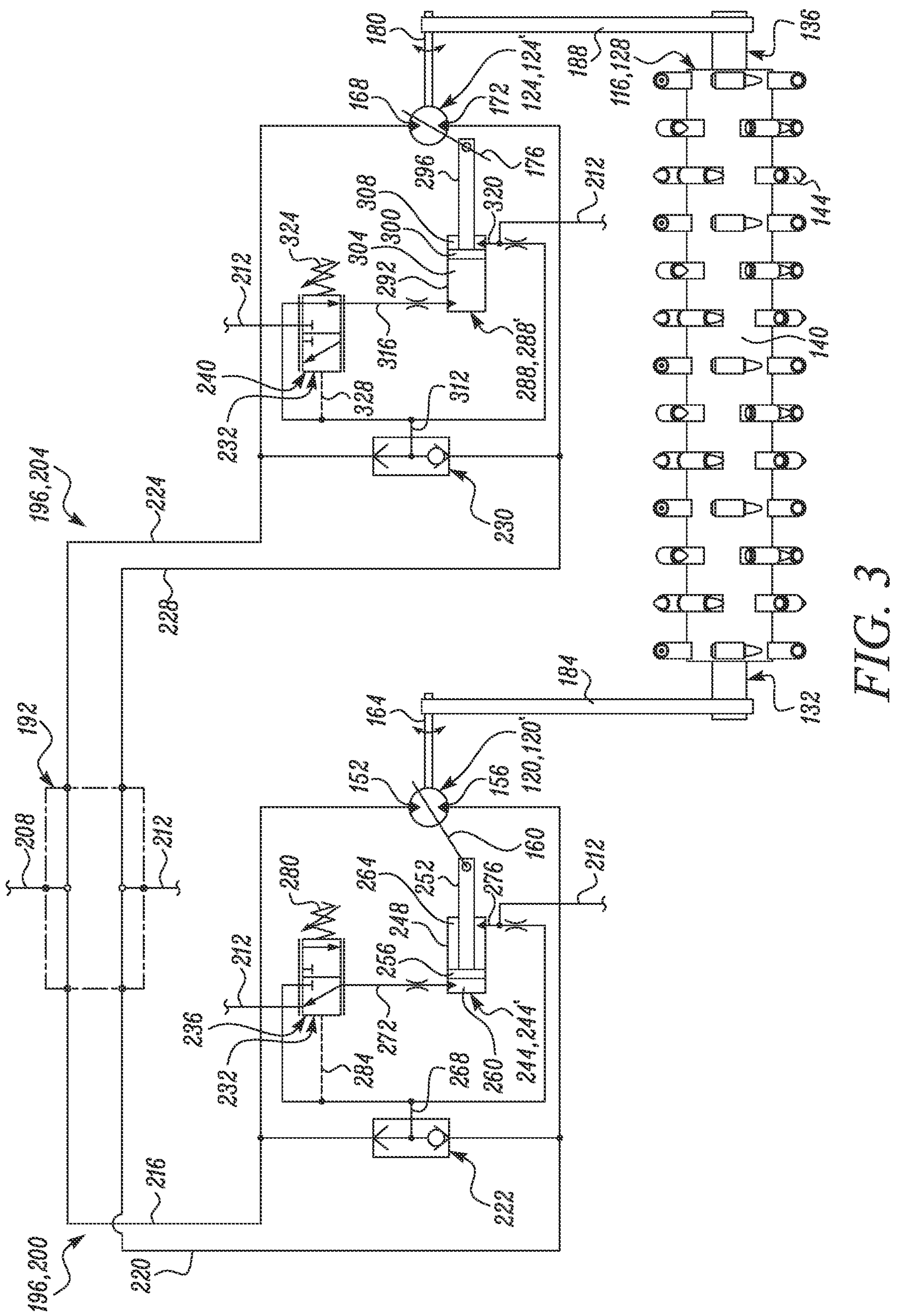
FIG. 3 illustrates a schematic diagram of the exemplary system configured to rotatably drive the implement at a second implement drive speed, in accordance with an embodiment of the present disclosure.

The first motor 120 may be a hydraulic motor 120' having a first port 152, a second port 156, a first swashplate 160, and a first output shaft 164 (please see FIG. 2). Each of the first port 152 and the second port 156 may enable the first motor 120 to receive or discharge the fluid to drive the first output shaft 164. The first swashplate 160 may be configured to pivot between two positions, i.e., a first position (as shown in FIG. 2) and a second position (as shown in FIG. 3). In the first position, the first swashplate 160 may enable the first motor 120 to allow a minimum fluid flow across the first port 152 and the second port 156. In the second position, the first swashplate 160 may enable the first motor 120 to allow a maximum fluid flow across the first port 152 and the second port 156.

Figure 4:
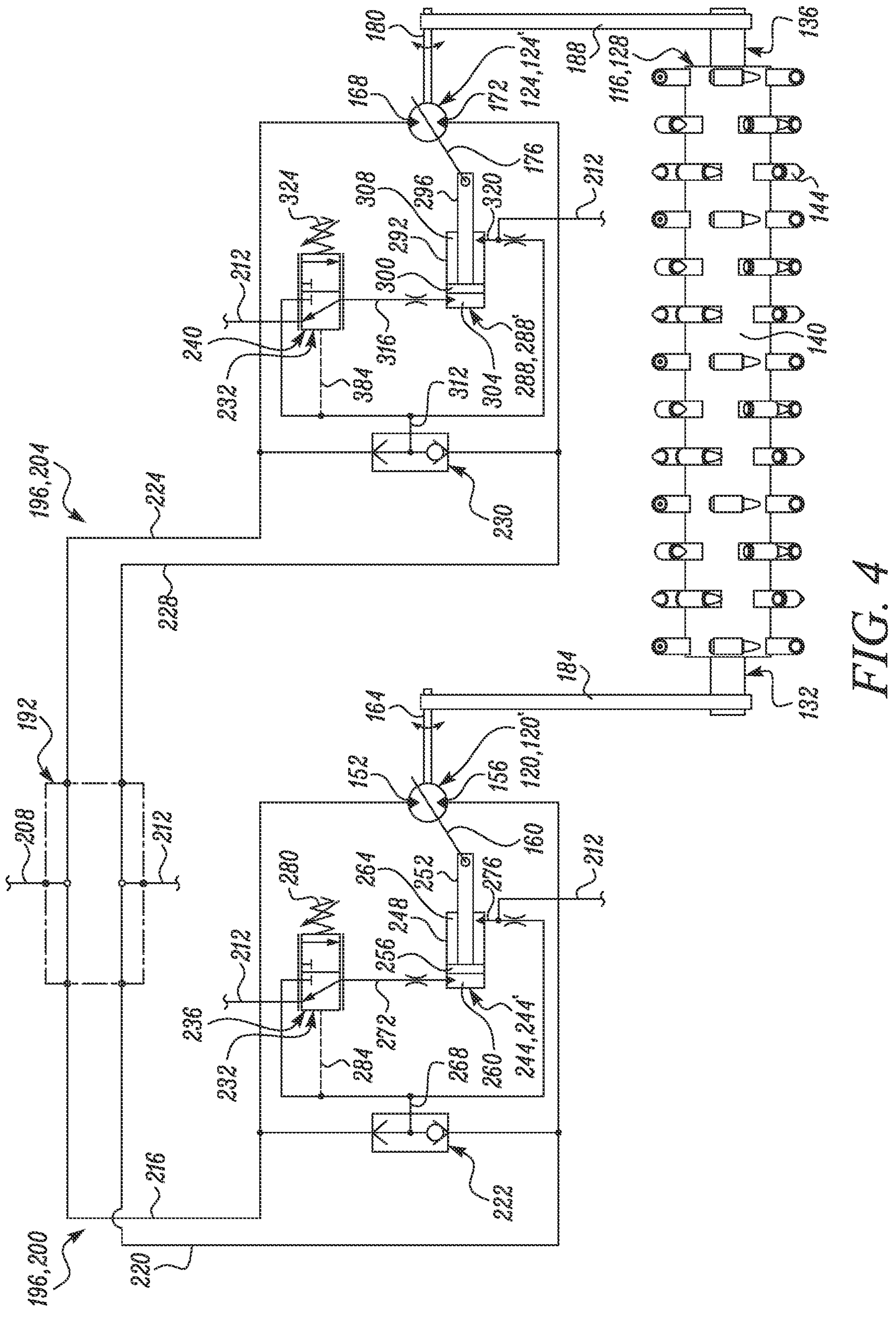
FIG. 4 illustrates a schematic diagram of the exemplary system configured to rotatably drive the implement at a third implement drive speed, in accordance with an embodiment of the present disclosure.

Similar to the first motor 120, the second motor 124 may be a hydraulic motor 124' having a third port 168, a fourth port 172, a second swashplate 176, and a second output shaft 180. Each of the third port 168 and the fourth port 172 may enable the second motor 124 to receive or discharge the fluid to drive the second output shaft 180. The second swashplate 176 may be configured to pivot between two positions, i.e., a third position (as shown in FIG. 2) and a fourth position (as shown in FIG. 4). In the third position, the second swashplate 176 may enable the second motor 124 to allow a minimum fluid flow across the third port 168 and the fourth port 172. In the fourth position, the second swashplate 176 may enable the second motor 124 to allow a maximum fluid flow across the third port 168 and the fourth port 172.

Both the first motor 120 and the second motor 124 may be housed within the chamber 148. The first motor 120 and the second motor 124 may be coupled to the implement 116. In the present embodiment, the first output shaft 164 of the first motor 120 is coupled to the first end portion 132 of the implement 116, e.g., via a first power transmission belt 184, and the second output shaft 180 of the second motor 124 is coupled to the second end portion 136 of the implement 116, e.g., via a second power transmission belt 188 (as shown in FIG. 2). Accordingly, the first motor 120 and the second motor 124 combinedly provide rotary power to the implement 116.

Referring to FIGS. 2-4, a fluid manifold 192 and two hydraulic circuits 196, i.e., —a first hydraulic circuit 200 and a second hydraulic circuit 204, are shown. The fluid manifold 192 may be configured to fluidly connect each of the first hydraulic circuit 200 and the second hydraulic circuit 204 with a hydraulic pump supply line 208 and a reservoir line 212 of the machine 100.

The first hydraulic circuit 200 may include a first fluid line 216 and a second fluid line 220. The first fluid line 216 may be configured to fluidly connect the first port 152 of the first motor 120 with the fluid manifold 192 in a manner to communicate the fluid, at a plurality of drive pressures, to the first motor 120 from the hydraulic pump supply line 208. The second fluid line 220 may be configured to fluidly connect the second port 156 of the first motor 120 with the fluid manifold 192 in a manner to communicate the fluid to the reservoir line 212 from the first motor 120.

Also, the first hydraulic circuit 200 may include a first shuttle valve 222. The first shuttle valve 222 may be fluidly coupled to the first fluid line 216 and the second fluid line 220. The first shuttle valve 222 may be configured to allow the fluid to flow therethrough from a relatively higher fluid pressure line out of the first fluid line 216 and the second fluid line 220, and restrict the fluid to flow therethrough from a relatively lower fluid pressure line out of the first fluid line 216 and the second fluid line 220. In the present embodiment, the first shuttle valve 222 allows the fluid from the first fluid line 216 to flow therethrough and restricts the fluid from the second fluid line 220 to flow therethrough. Further, the first hydraulic circuit 200 may include other components (e.g., flushing valves, relief valves, etc.) known in the art as well, but they are not shown or discussed for brevity.

Similar to the first hydraulic circuit 200, the second hydraulic circuit 204 may include a third fluid line 224 and a fourth fluid line 228. The third fluid line 224 may be configured to fluidly connect the third port 168 of the second motor 124 with the fluid manifold 192 in a manner to communicate the fluid, at the plurality of drive pressures, to the second motor 124 from the hydraulic pump supply line 208. The fourth fluid line 228 may be configured to fluidly connect the fourth port 172 of the second motor 124 with the fluid manifold 192 in a manner to communicate the fluid to the reservoir line 212 from the second motor 124.

Also, the second hydraulic circuit 204 may include a second shuttle valve 230. The second shuttle valve 230 may be fluidly coupled to the third fluid line 224 and the fourth fluid line 228. The second shuttle valve 230 may be configured to allow the fluid to flow therethrough from a relatively higher fluid pressure line out of the third fluid line 224 and the fourth fluid line 228, and restrict the fluid to flow therethrough from a relatively lower fluid pressure line out of the third fluid line 224 and the fourth fluid line 228. In the present embodiment, the second shuttle valve 230 allows the fluid from the third fluid line 224 to flow therethrough and restricts the fluid from the fourth fluid line 228 to flow therethrough. The second hydraulic circuit 204 may include other components (e.g., flushing valves, relief valves, etc.) known in the art as well, but they are not shown or discussed for brevity.

Further, the machine 100 includes a system 232. The system 232 provides rotary power to the implement 116. The system 232 includes a first motor control valve 236 and a second motor control valve 240. The first motor control valve 236 is associated with the first motor 120. In the present embodiment, the first motor control valve 236 is operatively coupled to the first swashplate 160 of the first motor 120 via a first actuator 244. The first actuator 244 may be a fluid actuator 244' having a cylinder portion 248 and a rod portion 252. The rod portion 252 may be displaceable with respect to the cylinder portion 248. The rod portion 252 may be fixedly coupled to a piston 256 (accommodated within the cylinder portion 248) at one end and to the first swashplate 160 at the other end. The piston 256 may divide the cylinder portion 248 into a head end chamber 260 and a rod end chamber 264. The head end chamber 260 may be fluidly coupled to the first motor control valve 236. Further, the first motor control valve 236 may be fluidly coupled to the first shuttle valve 222 via a fifth fluid line 268. Furthermore, the first motor control valve 236 may be fluidly coupled to the reservoir line 212.

The first motor control valve 236 may be configured to move (or actuate) between two states—a first state (as shown in FIG. 2) and a second state (as shown in FIG. 3). In the first state, the first motor control valve 236 may enable the first swashplate 160 to pivot to the first position (as shown in FIG. 2). For instance, in the first state, the first motor control valve 236 may direct the fluid from the fifth fluid line 268 to the head end chamber 260 (via a head end passageway 272) and may cause the rod end chamber 264 to release the fluid (via a rod end passageway 276) to the reservoir line 212 to move the piston 256 to a first location (as shown in FIG. 2) within the cylinder portion 248, thereby pivoting the first swashplate 160 to the first position. At the first position, the first swashplate 160 may allow the first motor 120 to operate at a first implement drive speed. The first implement drive speed may correspond to a first speed, first torque drive of the implement 116.

In the second state, the first motor control valve 236 may enable the first swashplate 160 to pivot to the second position (as shown in FIG. 3). For instance, in the second state, the first motor control valve 236 may direct the fluid from the fifth fluid line 268 to the rod end chamber 264 (via the rod end passageway 276) and may cause the head end chamber 260 to release the fluid (via the head end passageway 272) to the reservoir line 212 to move the piston 256 to a second location (as shown in FIG. 3) within the cylinder portion 248, thereby pivoting the first swashplate 160 to the second position. At the second position, the first swashplate 160 may allow the first motor 120 to operate at a second implement drive speed. The second implement drive speed may correspond to a second speed, second torque drive of the implement 116. The second speed may be relatively lower than the first speed, and the second torque may be relatively higher than the first torque.

The first motor control valve 236 may be configured to be biased to one of the first state or the second state and actuable to the other of the first state or the second state at a first shift point. For example, the first motor control valve 236 is biased towards the first state due to a first biasing force exerted by a first spring 280 on the first motor control valve 236 (as shown in FIG. 2) and is actuated to the second state at the first shift point (as shown in FIG. 3). The first shift point may correspond to a first drive pressure of the plurality of drive pressures communicated to the first motor 120 by the fluid flowing through the first fluid line 216. The first drive pressure may be generated and communicated to the first motor 120 based on loading of the implement 116 during operation. In an example, the first drive pressure may lie in a range of about 21000 kilopascals to about 23000 kilopascals.

At the first shift point (or when the fluid is communicated to the first motor 120 at the first drive pressure), a first pilot pressure line 284 (located downstream of the fifth fluid line 268 and upstream of the first motor control valve 236) may generate and deliver a first pilot pressure to the first motor control valve 236. On receipt of the first pilot pressure, the first motor control valve 236 may actuate, e.g., to the second state (from the first state) against the first biasing force of the first spring 280. In that manner, the first motor control valve 236 may be actuated based on the first drive pressure communicated to the first motor 120. As the first motor control valve 236 actuates from the first state to the second state (or vice versa) at the first shift point, the first motor 120 correspondingly switches from the first implement drive speed to the second implement drive speed (or vice versa). Further, as the first motor 120, the second motor 124, and the implement 116 are coupled to each other, the second motor 124 and the implement 116 also switch, along with the first motor 120, from the first implement drive speed to the second implement drive speed (or vice versa) at the first shift point.

The first shift point may be preset (e.g., by an operator of the machine 100) by adjusting (e.g., increasing or decreasing) stiffnesses of the first spring 280. In an example, the stiffness of the first spring 280 may be adjusted by rotating a spring tensioning member (not shown) associated with the first spring 280 of the first motor control valve 236. In other embodiments, the first shift point may be preset by selecting a spring (such as the first spring 280) having a desired coil diameter, or a desired wire diameter, or fabricated from a desired material.

The second motor control valve 240 is associated with the second motor 124. In the present embodiment, the second motor control valve 240 is operatively coupled to the second swashplate 176 of the second motor 124 via a second actuator 288. The second actuator 288 may be a fluid actuator 288' having a cylinder portion 292 and a rod portion 296. The rod portion 296 may be displaceable with respect to the cylinder portion 292. The rod portion 296 may be fixedly coupled to a piston 300 (accommodated within the cylinder portion 292) at one end and to the second swashplate 176 at the other end. The piston 300 may divide the cylinder portion 292 into a head end chamber 304 and a rod end chamber 308. The head end chamber 304 may be fluidly coupled to the second motor control valve 240. Further, the second motor control valve 240 may be fluidly coupled to the second shuttle valve 230 via a sixth fluid line 312. Furthermore, the second motor control valve 240 may be fluidly coupled to the reservoir line 212.

The second motor control valve 240 may be configured to move between two states—a third state (as shown in FIG. 2) and a fourth state (as shown in FIG. 4). In the third state, the second motor control valve 240 may enable the second swashplate 176 to pivot to the third position. For instance, in the third state, the second motor control valve 240 may direct the fluid from the sixth fluid line 312 to the head end chamber 304 (via a head end passageway 316) and may cause the rod end chamber 308 to release the fluid (via a rod end passageway 320) to the reservoir line 212 to move the piston 300 to a third location (as shown in FIG. 2) within the cylinder portion 292, thereby pivoting the second swashplate 176 to the third position. At the third position, the second swashplate 176 may allow the second motor 124 to operate at an implement drive speed equal to at least one of the first implement drive speed and the second implement drive speed.

In the fourth state, the second motor control valve 240 may enable the second swashplate 176 to pivot to the fourth position (as shown in FIG. 4). For instance, in the fourth state, the second motor control valve 240 may direct the fluid from the sixth fluid line 312 to the rod end chamber 308 (via the rod end passageway 320) and may cause the head end chamber 304 to release the fluid (via the head end passageway 316) to the reservoir line 212 to move the piston 300 to a fourth location (as shown in FIG. 4) within the cylinder portion 292, thereby pivoting the second swashplate 176 to the fourth position. At the fourth position, the second swashplate 176 may allow the second motor 124 to operate at a third implement drive speed (different from the first implement drive speed and the second implement drive speed). The third implement drive speed may correspond to a third speed, third torque drive of the implement 116. The third speed may be relatively lower than the first speed and the second speed, and the third torque may be relatively higher than the first torque and second torque.

The second motor control valve 240 may be configured to be biased to one of the third state or the fourth state and actuable to the other of the third state or the fourth state at a second shift point. For example, the second motor control valve 240 is biased towards the third state due to a second biasing force exerted by a second spring 324 on the second motor control valve 240 (as shown in FIG. 2) and is actuated to the fourth state at the second shift point (as shown in FIG. 4). The second shift point may correspond to a second drive pressure of the plurality of drive pressures communicated to the second motor 124 by the fluid flowing through the third fluid line 224. The second drive pressure may be generated and communicated to the second motor 124 based on the loading of the implement 116 during operation. In an example, the second drive pressure may lie in a range of about 25000 kilopascals to about 27000 kilopascals.

At the second shift point (or when the fluid is communicated to the second motor 124 at the second drive pressure), a second pilot pressure line 328 (located downstream of the sixth fluid line 312 and upstream of the second motor control valve 240) may generate and deliver a second pilot pressure to the second motor control valve 240. On receipt of the second pilot pressure, the second motor control valve 240 may actuate, e.g., to the fourth state (from the third state) against the second biasing force of the second spring 324. In that manner, the second motor control valve 240 may be actuated based on the second drive pressure communicated to the second motor 124. As the second motor control valve 240 actuates from the third state to the fourth state (or vice versa) at the second shift point, the second motor 124 correspondingly switches, for example, from the second implement drive speed to the third implement drive speed (or vice versa). Further, as the first motor 120, the second motor 124, and the implement 116 are coupled to each other, the first motor 120 and the implement 116 also switch, along with the second motor 124, from the second implement drive speed to the third implement drive speed (or vice versa) at the second shift point.

Similar to the first shift point, the second shift point may be preset (e.g., by the operator of the machine 100) by adjusting (e.g., increasing or decreasing) stiffnesses of the second spring 324. In an example, the stiffness of the second spring 324 may be adjusted by rotating a spring tensioning member (not shown) associated with the second spring 324 of the second motor control valve 240. In other embodiments, the second shift point may be preset by selecting a spring (such as the second spring 324) having a desired coil diameter, or a desired wire diameter, or fabricated from a desired material.

The second shift point (or the second pilot pressure) is different from the first shift point (or the first pilot pressure). In an exemplary embodiment, the second shift point and the first shift point are spaced apart from each other by at least 4000 kilopascals. For that, the stiffness of the second spring 324 may be set to a value different from a value of the stiffness of the first spring 280. In the present embodiment, the stiffness of the second spring 324 is relatively higher than the stiffness of the first spring 280, and accordingly, the second shift point (or the second drive pressure) is relatively higher than the first shift point (or the first pilot pressure).

Figure 5:
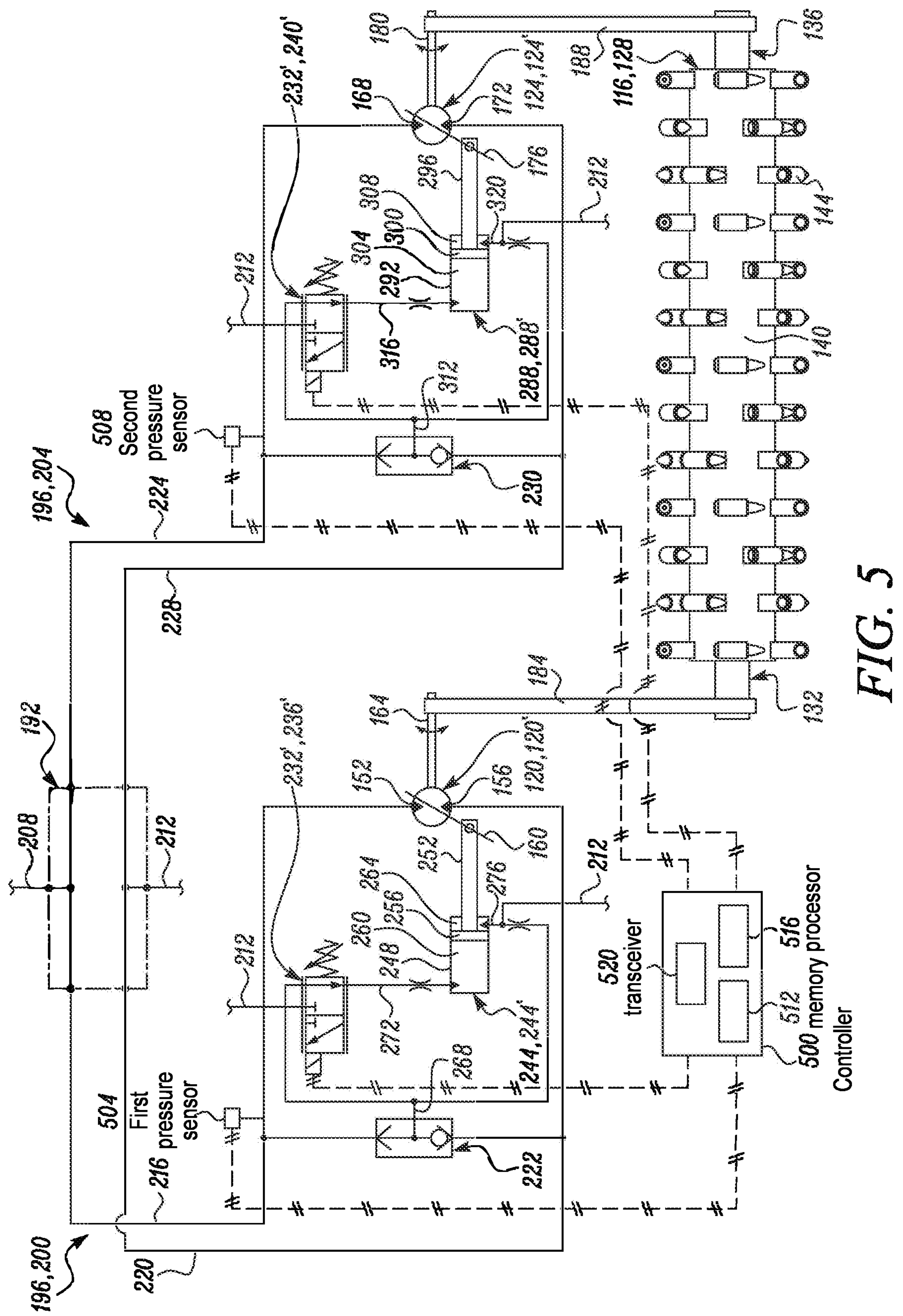
FIG. 5 illustrates a schematic diagram of an exemplary system configured to rotatably drive the implement at a first implement drive speed, in accordance with another embodiment of the present disclosure.

Referring to FIG. 5, a system 232' is shown. The system 232' is similar to the system 232 but differs from the system 232 in that the first pilot pressure line 284 and the second pilot pressure line 328 are omitted. Rather, the system 232' includes a first motor control valve 236', a second motor control valve 240', a controller 500, a first pressure sensor 504, and a second pressure sensor 508. The first motor control valve 236' may be similar to the first motor control valve 236 but differ from the first motor control valve 236 in that the first motor control valve 236' is solenoid actuated. Similarly, the second motor control valve 240' may be similar to the second motor control valve 240 but differ from the second motor control valve 240 in that the second motor control valve 240' is solenoid actuated. Accordingly, a further description of the first motor control valve 236' and the second motor control valve 240' are omitted for purposes of conciseness.

The first pressure sensor 504 may be configured to sense the drive pressures (e.g., the first drive pressure, the second drive pressure, etc.) of the fluid flowing through the first fluid line 216 and generate corresponding pressure readings (e.g., in kilopascals). The second pressure sensor 508 may be configured to sense the drive pressures of the fluid flowing through the third fluid line 224 and generate corresponding pressure readings.

The controller 500 may be communicably coupled to the first pressure sensor 504 and the second pressure sensor 508 to receive the pressure readings. Further, the controller 500 may compare and determine if the pressure readings matches with at least one of the first drive pressure (first shift point) and the second drive pressure (second shift point). The first drive pressure and the second drive pressure may be pre-stored in one or more memories 512 of the controller 500. On receipt of the pressure readings equal to the first drive pressure, the controller 500 may actuate the first motor control valve 236' from its corresponding first state to its corresponding second state. As a result, the first motor 120 switches from the first implement drive speed to the second implement drive speed. In addition, the second motor 124 and the implement 116 switch, simultaneously with the first motor 120, from the first implement drive speed to the second implement drive speed. Further, on receipt of the pressure readings equal to the second drive pressure, the controller 500 may actuate the second motor control valve 240' from its corresponding third state to its corresponding fourth state. As a result, the second motor 124 switches from the second implement drive speed to the third implement drive speed. In addition, the first motor 120 and the implement 116 switch, simultaneously with the second motor 124, from the second implement drive speed to the third implement drive speed.

The memory 512 may be configured to store data and/or routines that may assist the controller 500 to perform its functions. Examples of the memory 512 may include a hard disk drive (HDD), and a secure digital (SD) card. Further, the memory 512 may include non-volatile/volatile memory units such as a random-access memory (RAM)/a read only memory (ROM), which include associated input and output buses.

Also, the controller 500 may include a processor 516 to process the pressure readings received from the first pressure sensor 504 and the second pressure sensor 508. Examples of the processor 516 may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

In addition, the controller 500 may include a transceiver 520. According to various embodiments of the present disclosure, the transceiver 520 may enable the controller 500 to communicate (e.g., wirelessly) with the first pressure sensor 504, the second pressure sensor 508, the first motor control valve 236', and the second motor control valve 240', over one or more of wireless radio links, infrared communication links, short wavelength Ultra-high frequency radio waves, short-range high frequency waves, or the like. Example transceivers may include, but not limited to, wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

INDUSTRIAL APPLICABILITY

Figure 6:
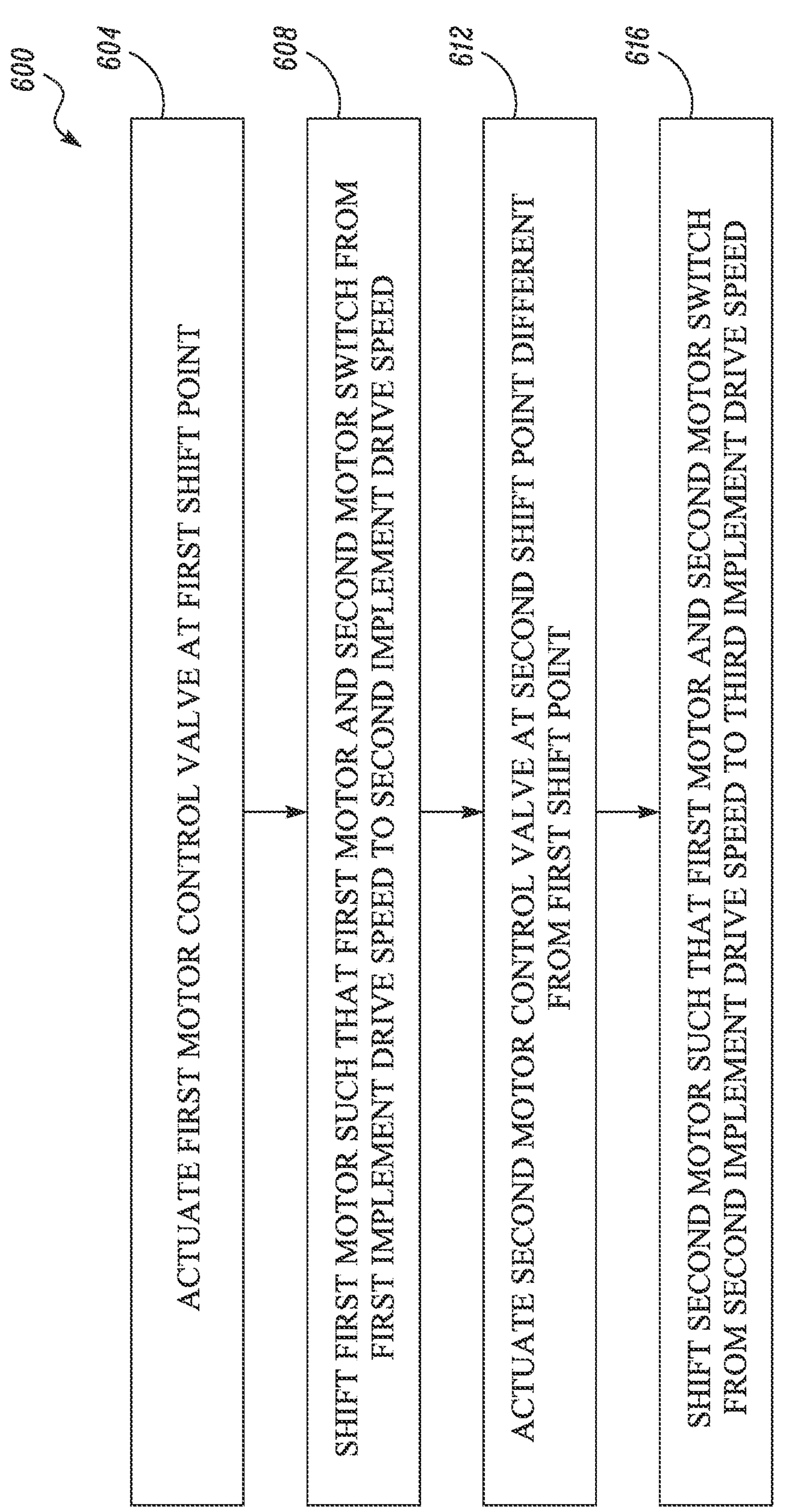
FIG. 6 is a flowchart illustrating an exemplary method for providing rotary power to the implement, in accordance with an embodiment of the present disclosure.
Figure 7:
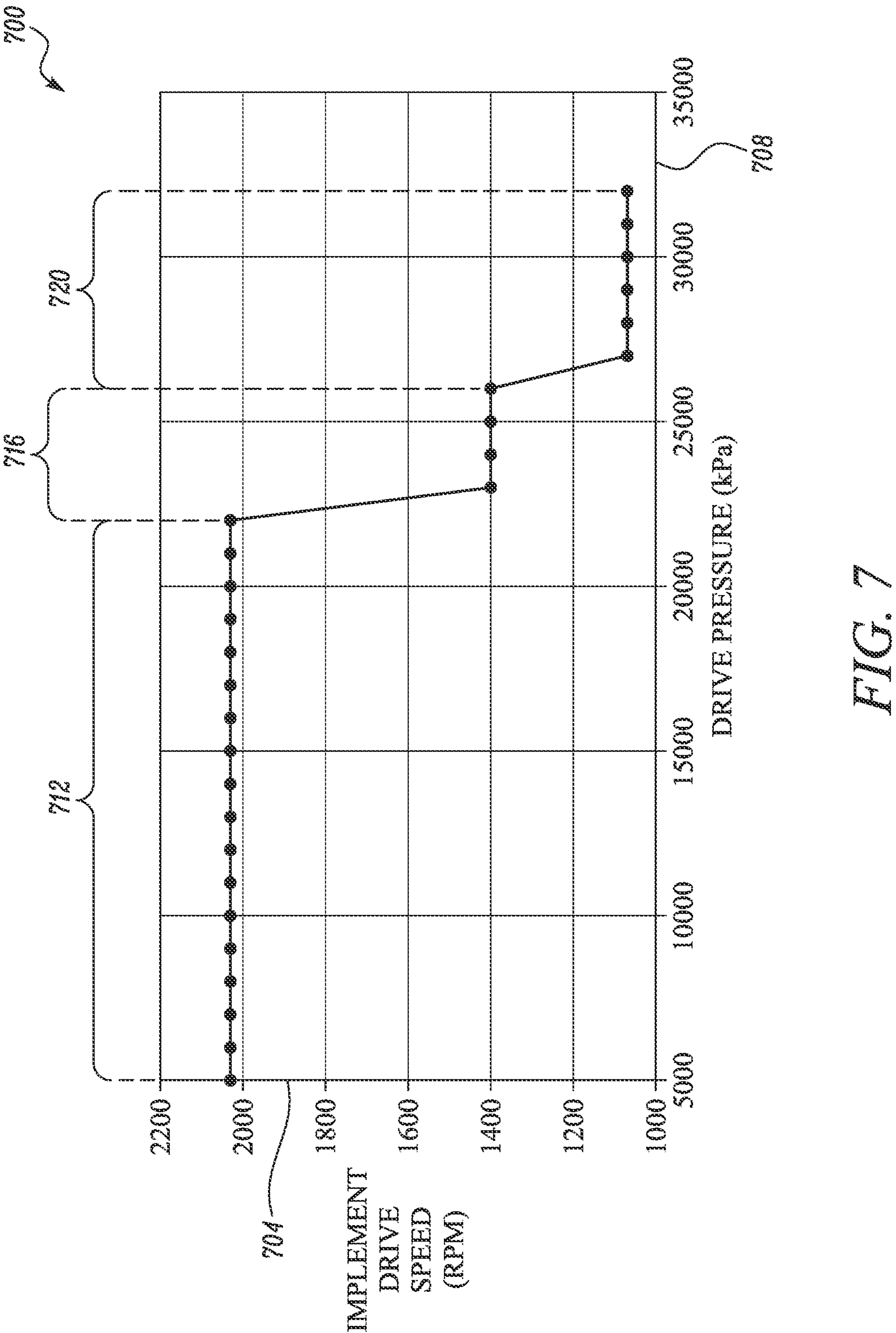
FIG. 7 illustrates a plot of an implement drive speed versus drive pressure, in accordance with an embodiment of the present disclosure.

Referring to FIGS. 6 and 7, an exemplary method for providing the rotary power to the implement 116 of the machine 100 is discussed. The method is discussed by way of a flowchart 600 (provided in FIG. 6) that illustrates exemplary stages (i.e., from 604 to 616) associated with the method, and a plot 700 (as provided in FIG. 7) that illustrates implement drive speeds (in rpm) of the implement 116 on an ordinate axis 704 and drive pressures (in kilopascals) supplied to the first motor 120 and the second motor 124 during the operation on an abscissa axis 708. The method is also discussed in conjunction with FIGS. 2, 3, and 4.

At the start of a work cycle, the implement 116 may operate under a first load, e.g., under no-load or low load when the implement 116 (or the cutting drum 128) forms a contact with the materials (e.g., trees, bushes, etc.). At this stage, the drive pressures of the fluids communicated to the first motor 120 (via the first fluid line 216) and the second motor 124 (via the third fluid line 224) is relatively lower than each of the first drive pressure (first shift point) and the second drive pressure (second shift point). Accordingly, the first motor control valve 236 may operate in the first state (due to the first biasing force of the first spring 280) to pivot the first swashplate 160 of the first motor 120 to the first position, and the second motor control valve 240 may operate in the third state (due to the second biasing force of the second spring 324) to pivot the second swashplate 176 of the second motor 124 to the third position.

For example, in the first state, the first motor control valve 236 may direct the fluid from the fifth fluid line 268 to the head end chamber 260 (via the head end passageway 272) and may cause the rod end chamber 264 to release the fluid (via the rod end passageway 276) to the reservoir line 212 to move the piston 256 to the first location within the cylinder portion 248, thereby pivoting the first swashplate 160 to the first position. Similarly, in the third state, the second motor control valve 240 may direct the fluid from the sixth fluid line 312 to the head end chamber 304 (via the head end passageway 316) and may cause the rod end chamber 308 to release the fluid (via the rod end passageway 320) to the reservoir line 212 to move the piston 300 to the third location within the cylinder portion 292, thereby pivoting the second swashplate 176 to the third position.

At the first position, the first swashplate 160 may enable the first motor 120 to output the first implement drive speed to the implement 116, e.g., via the first output shaft 164 and the first power transmission belt 184. Similarly, at the third position, the second swashplate 176 may enable the second motor 124 to output the first implement drive speed to the implement 116, e.g., via the second output shaft 180 and the second power transmission belt 188. As a result, at this stage, the first motor 120 and the second motor 124 combinedly facilitate the implement 116 to operate at the first implement drive speed, e.g., at the first speed of 2028 rpm (shown as a first operating mode 712 of the implement 116 in FIG. 7).

As the work cycle progresses, the loading of the implement 116 may increase to a second load from the first load, e.g., when relatively higher quantity of materials may come in contact the implement 116, as the machine 100 traverses towards the materials. Accordingly, the drive pressures of the fluids communicated to the first motor 120 and the second motor 124 may also increase. Once the drive pressures of the fluids communicated to the first motor 120 and the second motor 124 become equal to the first drive pressure (first shift point), the first pilot pressure is generated and delivered (e.g., by the first pilot pressure line 284) to the first motor control valve 236. Pursuant to the receipt of the first pilot pressure at the first shift point, the first motor control valve 236 may be actuated from the first state to the second state against the first biasing force of the first spring 280 (STAGE 604).

At the second state, the first motor control valve 236 may direct the fluid from the fifth fluid line 268 to the rod end chamber 264 (via the rod end passageway 276) and may cause the head end chamber 260 to release the fluid (via the head end passageway 272) to the reservoir line 212 to move the piston 256 to the second location within the cylinder portion 248 (as shown in FIG. 3), thereby pivoting the first swashplate 160 to the second position from the first position.

Once pivoted to the second position, the first swashplate 160 may enable the first motor 120 to shift from the first implement drive speed to the second implement drive speed. In addition, since the first motor 120 and the second motor 124 are operatively coupled to each other, the first motor 120 and the second motor 124 simultaneously switch from the first implement drive speed to the second implement drive speed (STAGE 608).

At the same time, the second pilot pressure line 328 may generate and deliver a third pilot pressure (similar to the first pilot pressure) to the second motor control valve 240. However, on receipt of the third pilot pressure, the second motor control valve 240 may continue to operate in the third state (as the third pilot pressure may fail to overcome the second biasing force of the second spring 324), and hence, output the second implement drive speed to the implement 116. As a result, at this stage, the first motor 120 and the second motor 124 combinedly facilitate the implement 116 to operate at the second implement drive speed, e.g., at a second speed of 1400 rpm (shown as a second operating mode 716 of the implement 116 in FIG. 7).

As the work cycle progresses further, the loading of the implement 116 may continue to increase from the second load to a third load. Accordingly, the drive pressures of the fluids communicated to the first motor 120 (via the first fluid line 216) and the second motor 124 (via the third fluid line 224) may correspondingly increase. Once the drive pressures of the fluids communicated to the first motor 120 and the second motor 124 become equal to the second drive pressure (second shift point), the second pilot pressure (which may be relatively higher than the third pilot pressure) is generated and delivered (e.g., by the second pilot pressure line 328) to the second motor control valve 240. Pursuant to the receipt of the second pilot pressure at the second shift point, the second motor control valve 240 may be actuated from the third state to the fourth state against the second biasing force of the second spring 324 (STAGE 612).

At the fourth state, the second motor control valve 240 may direct the fluid from the sixth fluid line 312 to the rod end chamber 308 (via the rod end passageway 320) and may cause the head end chamber 304 to release the fluid (via the head end passageway 316) to the reservoir line 212 to move the piston 300 to the fourth location within the cylinder portion 292 (as shown in FIG. 4), thereby pivoting the second swashplate 176 to the fourth position.

Once pivoted to the fourth position (from the third position), the second swashplate 176 may enable the second motor 124 to shift from the second implement drive speed to the third implement drive speed. In addition, since the first motor 120 and the second motor 124 are operatively coupled to each other, the first motor 120 and the second motor 124 simultaneously switch from the second implement drive speed to the third implement drive speed (STAGE 616).

At the same time, the first pilot pressure line 284 may generate and deliver a fourth pilot pressure (similar to the second pilot pressure) to the first motor control valve 236. On receipt of the fourth pilot pressure, the first motor control valve 236 may continue to operate in the second state (as the fourth pilot pressure may overcome the first biasing force of the first spring 280), and hence, output the third implement drive speed to the implement 116. As a result, at this stage, the first motor 120 and the second motor 124 combinedly facilitate the implement 116 to operate at the third implement drive speed, e.g., at a third speed of 1069 rpm (shown as a third operating mode 720 of the implement 116 in FIG. 7).

According to the embodiment of the system 232' (as disclosed in FIG. 5), the controller 500 may receive the pressure readings corresponding to the drive pressures of the fluids flowing through the first fluid line 216 and the third fluid line 224, e.g., via the first pressure sensor 504 and the second pressure sensor 508, respectively. When the loading of the implement 116 equals the first load, the controller 500 may receive the pressure readings corresponding to the drive pressures relatively lower than the first drive pressure (i.e., the first shift point). Accordingly, the controller 500 may allow the first motor control valve 236' and the second motor control valve 240' to operate in their corresponding first state and third state. As a result, at this stage, the first motor 120 and the second motor 124 combinedly facilitate the implement 116 to operate at the first implement drive speed.

As the loading of the implement 116 increases from the first load to the second load, the controller 500 may receive the pressure readings corresponding to the drive pressures equal to the first drive pressure (i.e., the first shift point). At this stage, the controller 500 may actuate the first motor control valve 236' from its corresponding first state to its corresponding second state, and accordingly, shift the first motor 120 from the first implement drive speed to the second implement drive speed. In addition, since the first motor 120 and the second motor 124 are operatively coupled to each other, the first motor 120 and the second motor 124 simultaneously switch from the first implement drive speed to the second implement drive speed. As a result, at this stage, the first motor 120 and the second motor 124 combinedly facilitate the implement 116 to operate at the second implement drive speed.

As the loading of the implement increases further from the second load to the third load, the controller 500 may receive the pressure readings corresponding to the drive pressures equal to the second drive pressure (i.e., the second shift point). At this stage, the controller 500 may actuate the second motor control valve 240' from its corresponding third state to its corresponding fourth state, and accordingly, shift the second motor 124 from the second implement drive speed to the third implement drive speed. In addition, since the first motor 120 and the second motor 124 are operatively coupled to each other, the first motor 120 and the second motor 124 simultaneously switch from the second implement drive speed to the third implement drive speed. As a result, at this stage, the first motor 120 and the second motor 124 combinedly facilitate the implement 116 to operate at the third implement drive speed.

As discussed above, with the application of the system 232, or 232', the first motor 120 and the second motor 124 are allowed to switch between multiple different implement drive speeds, in a staggered manner, to efficiently meet multiple different loadings of the implement 116. For example, the first motor 120 and the second motor 124 are allowed to operate: at the first implement drive speed when the loading of the implement 116 equals the first load (e.g., no-load or low load); at the third implement drive speed when the loading of the implement 116 equals the third load (e.g., high load) relatively higher than the first load; and at the second implement drive speed when the loading of the implement 116 equals the second load (e.g., intermediate load that is relatively higher than the first load and is relatively lower than the third load). In this manner, the system 232, or 232', provides an additional flexibility with respect to speed-torque control of the implement 116 of the machine 100.

It will be apparent to those skilled in the art that various modifications and variations can be made to the system, method, and/or machine of the present disclosure without departing from the scope of the disclosure. Other embodiments will be apparent to those skilled in the art from consideration of the specification and practice of the system, method, and/or machine disclosed herein. It is intended that the specification and examples be considered as exemplary only, with a true scope of the disclosure being indicated by the following claims and their equivalent.

What is claimed is:

1. A system for providing rotary power to an implement of a machine, the system comprising:

one or more ground engaging members configured to move the machine along a ground surface;

a first motor control valve associated with a first motor; and a second motor control valve associated with a second motor, wherein:

the first motor control valve is biased towards a first state and the second motor control valve is biased towards a third state, the first and third states corresponding to a higher speed, lower torque drive of the implement via the respective first and second motors, when the second motor control valve is in the third state, the first motor control valve is configured to be actuated at a first shift point, from the first state to a second state, that combined with the third state of the second motor control valve, corresponds to a lower speed, higher torque drive of the implement via the respective first and second motors, when the first motor control valve is in the second state, the second motor control valve is configured to be actuated at a second shift point, from the third state to a fourth state, that combined with the second state of the first motor control valve, corresponds to an even lower speed, even higher torque drive of the implement via the respective first and second motors, the first and second shift points are based on loading of the implement, the first and second shift points are different, the higher speed, lower speed, and even lower speed are different fixed speeds, the implement is driven at the higher speed and lower torque before reaching the first shift point, the implement is driven at the lower speed and higher torque between the first shift point and the second shift point, the implement is driven at the even lower speed and even higher torque after reaching the second shift point, and the implement is a cutting drum.

2. The system of claim 1, wherein the first shift point of the first motor control valve corresponds to a first drive pressure communicated to the first motor and the second shift point of the second motor control valve corresponds to a second drive pressure communicated to the second motor.

3. The system of claim 2, wherein the first and second drive pressures are different from each other.

4. The system of claim 1, wherein the system further comprises a controller including:

one or more memories; and one or more processors configured to:

actuate the first and second motor control valves at the corresponding first and second shift points.

5. The system of claim 1, wherein the first and second shift points are spaced, corresponding to loading of the implement, by at least 4000 kilopascals.

6. The system of claim 1, wherein at the higher speed, lower torque drive of the implement, the loading of the implement equals a first load, wherein at the lower speed, higher torque drive of the implement, the loading of the implement equals a second load, wherein at the even lower speed, even higher torque drive of the implement, the loading of the implement equals a third load, and wherein the second load is relatively higher than the first load and is relatively lower than the third load.

7. The system of claim 1, wherein the first motor is coupled to a first end portion of the implement and the second motor is coupled to a second end portion of the implement.

8. A machine, comprising:

one or more ground engaging members configured move the machine along a ground surface;

an implement configured to perform an operation on materials that the machine comes in contact with outside the machine, wherein the implement is a cutting drum;

a first motor and a second motor to rotatably drive the implement; and a system configured to provide rotary power to the implement, the system including:

a first motor control valve associated with the first motor and a second motor control valve associated with the second motor, wherein:

the first and second motor control valves are biased towards respective states that correspond to a first fixed implement drive speed for the implement, wherein the first fixed implement drive speed is a higher speed, lower torque drive of the implement, the first motor control valve is configured to be actuated at a first shift point to shift the first motor such that the first motor and the second motor switch between the first fixed implement drive speed for the implement and a second fixed implement drive speed for the implement, wherein the second fixed implement drive speed is a lower speed, higher torque drive of the implement, the second motor control valve is configured to be actuated at a second shift point to shift the second motor such that the first motor and the second motor switch between the second fixed implement drive speed and a third fixed implement drive speed for the implement, wherein the third fixed implement drive speed is an even lower speed, even higher torque drive of the implement, the first and second shift points are based on loading of the implement, the first and second shift points are different, a first plurality of pressures is communicated to the first motor and the second motor at the first fixed implement drive speed, and a second plurality of pressures is communicated to the first motor and the second motor at the second fixed implement drive speed.

9. The machine of claim 8, wherein the first shift point of the first motor control valve corresponds to a first drive pressure communicated to the first motor and the second shift point of the second motor control valve corresponds to a second drive pressure communicated to the second motor.

10. The machine of claim 9, wherein the first and second drive pressures are different from each other.

11. The machine of claim 8, wherein the first and second shift points are spaced, corresponding to loading of the implement, by at least 4000 kilopascals.

12. The machine of claim 8, wherein at the first fixed implement drive speed, the loading of the implement equals a first load, wherein at the second fixed implement drive speed, the loading of the implement equals a second load, wherein at the third fixed implement drive speed, the loading of the implement equals a third load, and wherein the second load is relatively higher than the first load and is relatively lower than the third load.

13. The machine of claim 8, wherein the first motor includes a first swashplate and the second motor includes a second swashplate, wherein on actuation of the first motor control valve, the first swashplate pivots to shift the first motor to the first fixed implement drive speed or the second fixed implement drive speed, and wherein on actuation of the second motor control valve, the second swashplate pivots to shift the second motor to the second fixed implement drive speed or the third fixed implement drive speed.

14. The machine of claim 8, wherein the first motor is coupled to a first end portion of the implement and the second motor is coupled to a second end portion of the implement.

* * * * *